UNITED STATES PATENT OFFICE.

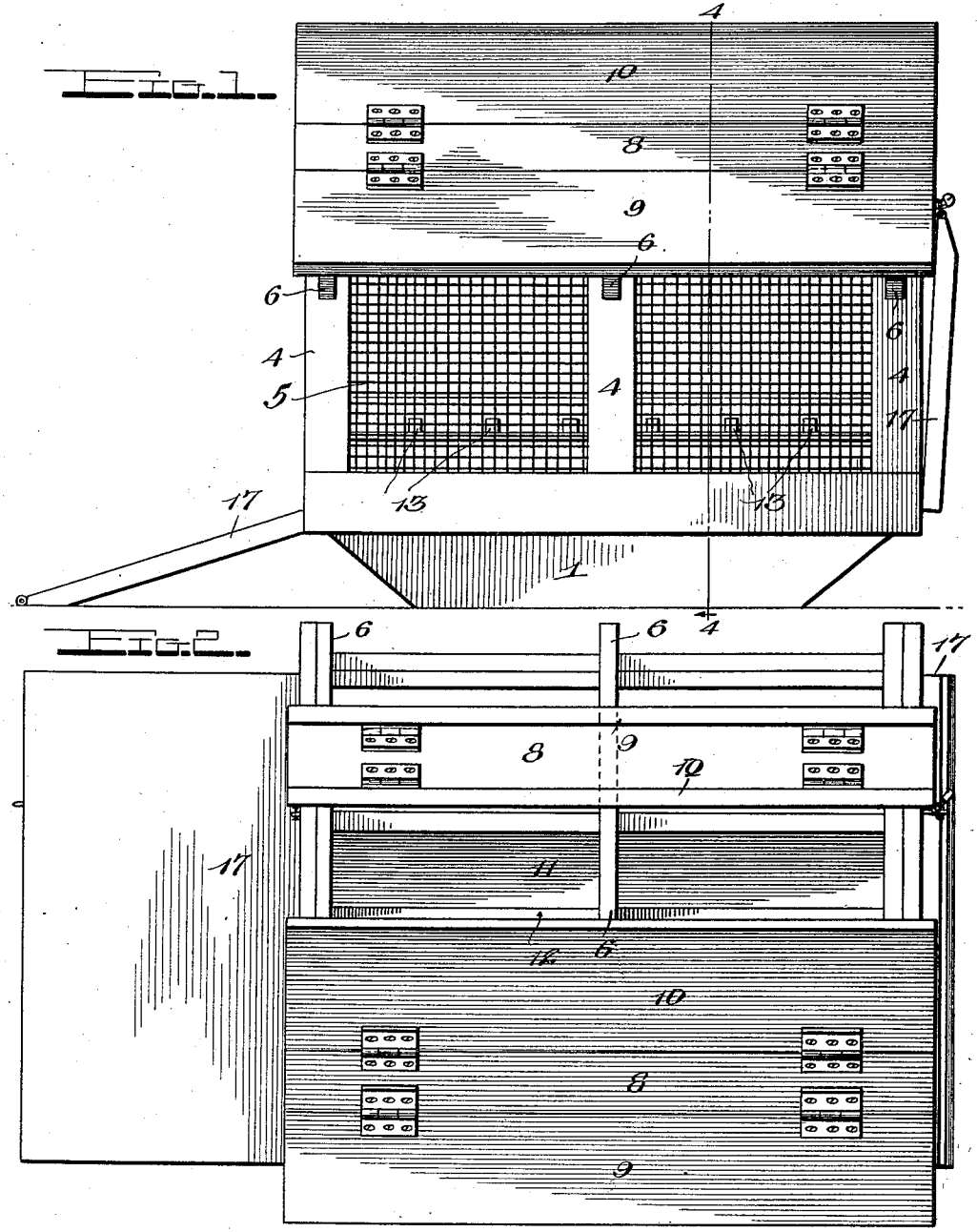

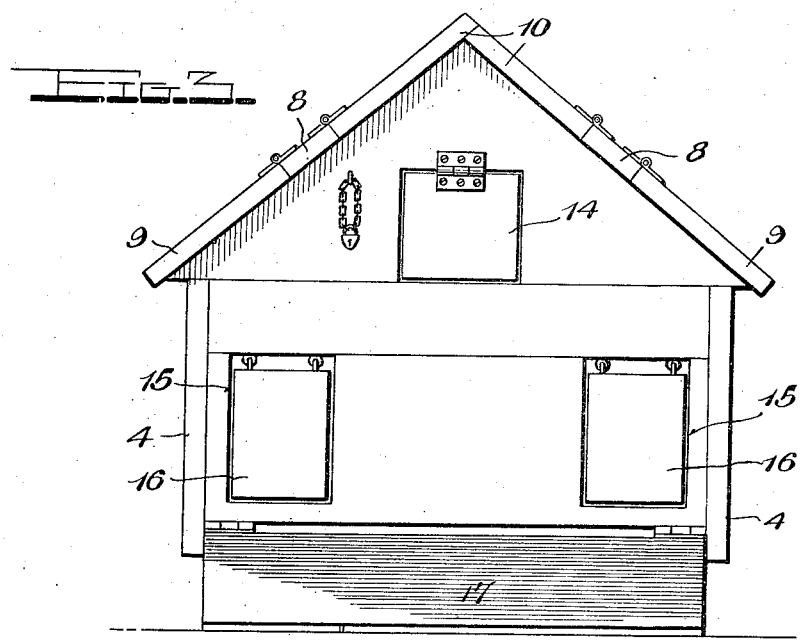
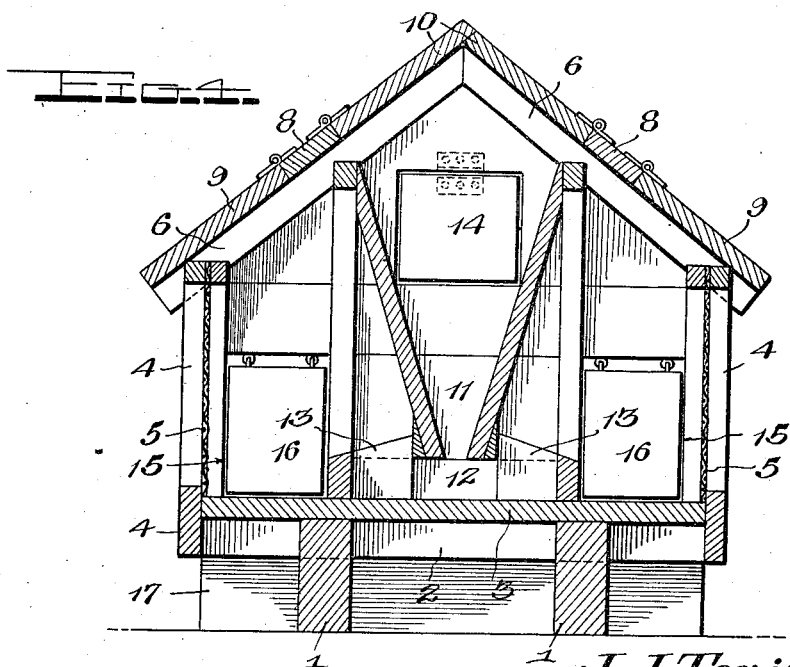

JESSE J. TEVIS, OF FORD, KENTUCKY.

HOG-FEEDER.

1,230,624.  Specification of Letters Patent.  Patented June 19, 1917.

Application filed December 27, 1916. Serial No. 139,083.

*To all whom it may concern:*

Be it known that JESSE J. TEVIS, a citizen of the United States, residing at Ford, in the county of Clark and State of Kentucky, has invented certain new and useful Improvements in Hog-Feeders, of which the following is a specification.

This invention relates to a combined hog feeder and portable house, the feeder housing the hogs during feeding time and also being adapted for use as a house for hogs, and especially for pigs when it is desired to protect them in times of bad weather. The device is also adapted to be used as a convenient means of transporting hogs from one field or pasture to another. When used as an ordinary feeder the feed is protected from weather and mud and is also protected against molestation by poultry.

On many farms where hogs are fed from open accessible troughs the poultry mix in with the hogs in an effort to get at the feed, and many are killed by the hogs in such efforts. As fowls are usually given free range on a farm there is no practical way of preventing losses of this kind, and they are frequently serious, where outside troughs are used or no provision made for admitting hogs and excluding fowls.

The invention consists of the novel features of construction hereinafter described, pointed out in the claims and shown in the accompanying drawings, in which:—

Figure 1 is a side elevation.

Fig. 2 is a plan view, the cover lids on one side being raised, and the platform at one end being elevated.

Fig. 3 is an end view.

Fig. 4 is a vertical cross section on the line 4—4 of Fig. 1.

On parallel skids 1 are mounted transverse joists 2 on which is laid a flooring 3. Side frames 4 provided with screens 5, support roof rafters 6. Ends 7 are also provided, and the roof is formed of two longitudinal members 8, arranged respectively between the eaves and ridge, and to the opposite sides of said members are hinged oppositely opening covers or lids 9, and 10.

Running the full length of the housing and closed at the top by the covers 10 is a food receiving hopper 11.

The hopper has converging sides and discharges at its bottom into a trough 12, also running the full length of the house, and said trough, on each side of the hopper, is divided by partitions 13 into any desired number of small food compartments. The hopper and trough also divide the housing into two compartments or rooms, the trough being common to each.

Vertically swinging feed doors 14 are placed in the gable portion of each end and through said doors feed may be shoveled into the hopper. By forming the roof of hinged covers, cleaning, ventilating and drying the hopper is made easy, and by lifting the covers 9 ready access is given from the top to either of the house feeding compartments. Suitable end hog entrances 15 are provided at the ends of each of the compartments of the house, and said entrances are normally closed by doors 16 hinged at their upper ends. These doors can be readily lifted by the hogs and give them free entrance to and exit from the feeding compartments, but owing to their weight they will exclude fowls.

At each end of the house is hinged a platform 17.

When lowered these platforms afford easy access to the entrances 15 but when lifted into vertical position they close said entrances, preventing either entrance of hogs or exit. Any suitable means may be employed for locking the platforms in vertical position, such as a chain and padlock.

If it is desired to use the feeding trough and its housing as a means of conveying hogs from one pasture to another it is only necessary to admit them to the troughs, and by raising and securing the platforms they are confined against escape. A team can then be hitched to an end of the house, in any way convenient, and the same drawn on the skids to the new pasture or lot, and the platforms lowered, thus releasing the hogs. Or during very inclement and wintry weather they may be confined in the house for any reasonable length of time. A house and feed trough of this character will be found very convenient for housing young pigs at and just after weaning time.

The house will also accommodate two sows and their litters. In fact the construction of this feed trough makes it available for many purposes for which the ordinary exposed trough could not be employed.

What I claim is:—

1. A device of the kind described comprising an elevated, portable housing, having reticulated sides, and hinged covers, a feed hopper arranged longitudinally the full length of said housing, and closed by a portion of said covers, a trough receiving material from said hopper, the hopper and trough dividing said housing into two separate compartments, end entrances to said compartments, vertically swinging doors normally closing said entrances, and hinged end platforms, adapted when lifted to cover said doors.

2. In a combined hog trough and house, skids, a flooring supported on said skids, a roof formed of a plurality of hinged vertically lifting sections, end members for said housing, wire side members, a trough arranged centrally and longitudinally in the housing and extending from end to end, a hopper arranged above said trough and of the same length, a portion of the hinged roof sections forming covers for the hopper, said hopper dividing the housing into two compartments, and the remaining hinged roof sections opening respectively into said compartments, the end members having openings leading respectively into the hopper and into said compartments, swinging doors for said openings, and hinged end platforms leading when in lowered position to the compartment doors and when elevated covering said doors and preventing exit of the animals confined in said housing.

In testimony whereof I affix my signature.

JESSE J. TEVIS.

Copies of this patent may be obtained for five cents each, by addressing the "Commissioner of Patents, Washington, D. C."